United States Patent [19]

Iida et al.

[11] Patent Number: 4,869,948
[45] Date of Patent: Sep. 26, 1989

[54] GLASS BOARD FOR COPYING MACHINES AND METHOD OF PRODUCING SAME

[75] Inventors: Yasunobu Iida; Toshiharu Yanai; Koichi Furuya, all of Matsusaka, Japan

[73] Assignee: Central Glass Company, Limited, Ube, Japan

[21] Appl. No.: 170,154

[22] Filed: Mar. 18, 1988

[30] Foreign Application Priority Data

Mar. 20, 1987 [JP] Japan ................................. 62-65949

[51] Int. Cl.$^4$ ........................ B32B 9/00; B32B 17/06
[52] U.S. Cl. ................................... 428/216; 428/333; 428/410; 428/426; 428/428; 428/432; 428/446; 428/450; 428/702; 428/220; 428/447; 428/429; 427/167; 427/387
[58] Field of Search ............... 428/216, 210, 195, 704, 428/447, 410, 333, 220, 423.1, 425.6, 425.9, 426, 428, 218, 432, 429, 446, 450, 689, 702, 469, 213; 427/387, 167

[56] References Cited

U.S. PATENT DOCUMENTS

| 3,420,693 | 1/1969 | Scholes et al. ...................... 428/432 |
| 4,006,070 | 2/1977 | King et al. ...................... 204/192.29 |
| 4,272,587 | 6/1981 | Santiago ............................... 428/432 |
| 4,431,692 | 2/1984 | Hofmann et al. .................... 428/35 |
| 4,765,729 | 8/1988 | Taniguchi ........................... 428/429 |

FOREIGN PATENT DOCUMENTS 56-159345  4/1955  Japan .
57-90668   6/1982  Japan .

*Primary Examiner*—Ellis P. Robinson
*Assistant Examiner*—Donald J. Loney
*Attorney, Agent, or Firm*—Fleit, Jacobson, Cohn, Price, Holman & Stern

[57] ABSTRACT

The invention relates to a transparent glass board for use in document copying machines as the copying glass on which each sheet of original documents is placed and, in the case of copying machines of automatic document feed type, is forced to slide. To ensure good copying and smooth sliding carriage of original paper sheets, a transparent antistatic coating layer using tin oxide and/or indium oxide is formed on one or each of the top and back surfaces of a transparent glass, and a transparent lubricative coating layer using an organic silicon compound having isocyanate groups attached to Si atom is formed on the top side of the glass plate so as to provide a top surface with which each sheet of documents comes into contact. The antistatic layer has a thickness of 300–1500 Å and the lubricative layer has a thickness of 300–2000 Å.

12 Claims, No Drawings

GLASS BOARD FOR COPYING MACHINES AND METHOD OF PRODUCING SAME

BACKGROUND OF THE INVENTION

This invention relates to a transparent glass board for use in document copying machines as the copying glass on which an original document is to be placed, and more particularly to an antistatic and lubricative glass board particularly suitable for use in copying machines having an automatic original document feeding means and to a method of producing the same.

Many recent document copying machines have a means for automatically feeding each sheet of an original document onto a transparent glass board placed above a light source and carrying the sheet on the glass board. Usually the original document feed means comprises a rubber belt which is rotatively driven on the glass board by several rolls turning in synchronism with a pair of document feed rolls. In operation of the copying machine the rubber belt keeps in rubbing contact with the glass board and forces each sheet of the document to slide on the glass board. Accordingly static electricity is produced by friction between the paper sheet and the glass board and also between the rubber belt and the glass board. Since both the rubber belt and the glass board are dielectric the static electricity can hardly dissipate, and consequently a large quantity of electrostatic charge accumulates between the glass board and the rubber belt. The charge offers an obstacle to smooth carriage of the paper sheets on the glass board and sometimes results in trapping of the paper sheets. Besides, dust adheres to the glass board and becomes a cause of unsatisfactory copying.

Naturally some antistatic measures have been proposed. For example, JP-UM-A 56-159345 shows providing an electroconductive and transparent coating layer to the copying glass board on its back side facing the light source and grounding the conductive layer, and JP-A 57-90668 shows a transparent antistatic coating layer on the top side of the glass board. However, the antistatic coating on the back side of the glass board hardly has the effect of ensuring smooth carriage of original document sheets on the glass board, and the antistatic coating on the top side is rather obstructive to the sliding of the paper sheets because of being inferior to glass in surface smoothness and is problematic in respect of durability.

Besides, there are proposals of providing an antistatic means or a discharge means to the paper carrying rubber belt and/or related parts of the copying machine. However, these measures involve complication of parts manufacture and a substantial rise in the cost of production.

SUMMARY OF THE INVENTION

It is an object of the present invention to provide an antistatic glass board which has a very lubricative surface and is very suitable for use in document copying machines, particularly copying machines having automatic document feed means, as the copying glass board on which original document sheets are to be placed.

It is another object of the invention to provide a method of producing a glass board according to the invention.

A glass board according to the invention comprises a transparent glass plate, and a transparent and electroconductive antistatic coating layer is formed on one or each of the top and back surfaces of the glass plate. The antistatic layer has a thickness in the range of from 300 to 1500 Å. Furthermore, a transparent lubricative coating layer is formed on the top side of the glass plate so as to provide a top surface of the glass board over at least a selected area where each sheet of original documents to be copied makes contact with the glass board. That is, when the antistatic coating layer exists on the top surface of the glass plate the lubricative coating layer is formed on the antistatic layer. The lubricative layer has a thickness in the range of from 300 to 2000 Å.

In this glass board the transparent antistatic layer is usually formed of tin oxide and/or indium oxide. Preferably the transparent lubricative layer is formed of an organic silicon compound having at least one Si atom to which at least one isocyanate group—NCO is attached.

The type of the glass plate is not particularly limited, though it is preferable to use a chemically strengthened or thermally tempered glass plate. Of course the glass plate is desired to be sufficiently high in light transmittance. That is, it is preferable to use a glass plate not lower than 90% in transmittance for visible light.

It is suitable to produce a glass board according to the invention by the steps of coating either or both of the top and back surfaces of a transparent glass plate with a dispersion of very fine particles of tin oxide and/or indium oxide in a liquid medium or a solution of an organic tin compound and/or an organic indium compound, baking the coated glass plate at a temperature in the range of from 80 to 300° C to thereby form the transparent antistatic layer, then applying a solution of an organic silicon compound of the aforementioned type to the top side of the glass plate and baking the glass plate at a temperature in the range of from 80 to 300° C to thereby form the transparent lubricative layer.

A glass board according to the invention is sufficiently antistatic. According to the need the antistatic coating layer can be formed on either or both of the top and back surfaces of the glass plate, and each antistatic layer has the effect of reducing surface resistivity of the glass board to the level of $10^9$ Ω or below. Even when the top surface of the glass plate is laid with the antistatic layer which has a higher coefficient of friction than the glass, the lubricative coating layer provides a top surface excellent in lubricity so that paper sheets can smoothly slide on this glass board. In fact, the lubricative coating layer is better in lubricity than the surface of a chemically strengthened glass plate, so that the provision of the lubricative coating layer has an important merit even when the antistatic treatment is made only on the back surface of the glass plate. Furthermore, the lubricative coating layer is high in durability and sufficiently resistant to soiling and scratching. The provision of the antistatic and lubricative layers has little adverse effects on the strength and transparency of the glass board.

As the copying glass in copying machines of automatic document feed type, a glass board according to the invention fully exhibits its merits and ensures good copying and smooth sliding of paper sheets on the board without need of adding extra means. Besides, glass boards according to the invention will have applications to other kinds of business machines and some electronic devices and, possibly, to further different uses.

DESCRIPTION OF THE PREFERRED EMBODIMENTS

The antistatic coating layer in the present invention is a transparent and electroconductive coating film analogous to transparent and conductive electrode films often employed in electronic or optoelectronic devices. Usually this coating layer is a metal oxide film formed of $SnO_2$ and/or $In_2O_3$, or $SnO_2$ and $Sb_2O_3$. If desired, a thin film of a suitable metal such as Au, Ag or Pd can be used as the antistatic coating layer. Still differently, the antistatic coating layer may be a multilayer coating having metal and metal oxide films such as a three-layer coating of $Bi_2O_3$/Au (or Ag)/$Bi_2O_3$ or $TiO_2$/Ag/$TiO_2$. A film of tin oxide and/or indium oxide can be formed on a glass surface by a physical or chemical vapor deposition technique. However, in this invention it is preferred to use a coating liquid containing tin oxide and/or indium oxide, or organic tin and/or indium compound(s), as will be described hereinafter.

In the present invention the thickness of the antistatic coating layer is limited within the range from 300 to 1500 Å. When this layer is thinner than 300 Å it is difficult to reduce surface resistivity to the level of $10^9$ Ω or below, and durability of this layer becomes insufficient. On the other hand, when this layer is made thicker than 1500 Å transparency of the glass board becomes unsatisfactory. Preferably the antistatic layer is formed to a thickness of 500–1000 Å.

In preferred embodiments of the invention the material of the transparent lubricative coating layer is an organic silicon compound having isocyanate group as stated hereinbefore. The following are good examples of the organic silicon compound for the lubricative layer: $Si(NCO)_4$, $CH_3Si(NCO)_3$, $CH_3OSi(NCO)_3$, $[(CH_3)_2Si(NCO)_2]O$,

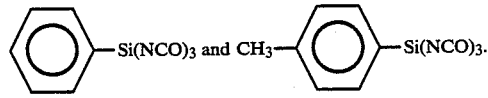

The thickness of the lubricative coating layer is limited within the range from 300 to 2000 Å. When the thickness is less than 300 Å durability of this layer becomes insufficient. When this layer is made thicker than 2000 Å transparency of the glass board becomes insufficient, and, if the lubricative layer is underlaid with the antistatic layer, the antistatic effect is obstructed. Preferably the lubricative layer is formed to a thickness of 500–1500 Å.

Usually a glass board according to the invention is produced in the following way using a transparent glass plate, preferably a strengthened glass plate.

As a coating liquid to form the antistatic layer a dispersion of very fine particles of tin oxide and/or indium oxide, or tin oxide and antimony oxide, in a suitable liquid medium such as an alcohol is useful. The dispersion may optionally contain a binder such as silica. It is also possible to use a solution of an organic tin compound and/or an organic indium compound, or an organic tin compound and an organic antimony compound, in a suitable organic solvent. Examples of useful organic metal compounds are acetylacetonatotin, acetoxy n-butyltin, antimony n-butoxide, tin chloride alkoxide of ethylene glycol ethyl ether and indium chloride alkoxide of ethylene glycol ethyl ether.

The selected coating liquid is applied to the selected surface(s) of the glass plate at room temperature or an elevated temperature not higher than about 80° C. by a suitable coating method such as, for example, roll coating, dipping or spraying. The coated glass plate is baked at a temperature in the range from 80 to 300° C. to thereby form a transparent antistatic layer.

Next, a solution of an organic silicon compound having at least one —NCO group is applied to the top surface of the glass plate by a suitable coating method as mentioned above. The coating is made either over the entire surface area or over only a selected area where paper sheets will come into contact with the glass board. When the top surface of the glass plate is already coated with the antistatic layer the organic silicon compound solution is applied onto the antistatic layer. Then the glass plate is baked at a temperature in the range from 80 to 300° C. to thereby form a transparent and lubricative coating layer.

In the above process the maximum of the baking temperatures is set at 300° C. This is primarily because baking at temperatures above 300° C. causes lowering of the strength of the glass plate, and particularly significant lowering of the degree of strengthening of a chemically strengthened glass plate. Besides, baking at such high temperatures results in degradation of the antistatic or lubricative property of the obtained coating layer. In the case of baking the lubricative layer at excessively high temperatures the lowering of the lubricative property is attributed to failure to retain undecomposed organic hydrophobic groups on the surface. The lower limit of the baking temperatures is set at 80° C. because at lower temperatures each baking operation requires a very long time and the obtained coating layer is poor in durability. Preferably each baking operation is carried out at 100–270° C.

EXAMPLE 1

A chemically strengthened glass sheet (4 mm in thickness and 350 mm × 450 mm in widths) was cleaned and dried. At room temperature a commercial tin oxide sol was applied to a top surface of the glass plate by a roll coating method. The sol was a dispersion of very fine particles of $SnO_2$ and $SiO_2$ in a mixture of methanol and ethanol, in which the solid content was 5 wt %. The coated glass plate was baked at about 250° C. for about 2 hr. As the result a transparent tin oxide film having a thickness of about 700 Å was formed on the glass surface. This coating film had surface resistivity of $10^{6}$–$10^{9}$ Ω and accordingly could be called an antistatic coating film. Next, a mixed solution of $CH_3Si(NCO)_3$ and $[(CH_3)_2Si(NCO)_2]O$ in ethyl acetate was applied onto the surface of the antistatic coating film by a roll coating method, and the glass plate was baked at about 250° C. for about 2 hr. As the result a transparent lubricative coating film having a thickness of about 700 Å was formed.

The glass board produced by the above process exhibited an average transmittance of about 89% for visible light, which means only an ignorable change from the transparency of the chemically strengthened glass plate before coating. As an indication of lubricity of the coated top surface of the glass board, angle of slip of the top surface was measured by placing a weight of 50 g on the glass board and slowly lifting up one edge of the board with the opposite edge as the fulcrum until the weight began to slide down. On an average of measurements on five samples, the angle of slide was 13.9 degrees.

The glass board was installed in a copying machine of automatic document feed type, and the copying machine was operated until 10000 sheets of paper were carried on the top surface of the glass board which was never cleaned midway the machine operation. After that, surface potential of the glass board was measured to be −0.8 kV (on an average of measurements on five samples), and the lubricative coating film was neither soiled nor scratched.

EXAMPLE 2

Using the chemically strengthened glass plate described in Example 1, a transparent antistatic coating film of tin oxide having a thickness of about 700 Å and surface resistivity of $10^5$–$10^9$ Ω was formed on the back surface of the glass plate by the same coating and baking operations as in Example 1. Then a transparent lubricative coating film having a thickness of about 700 Å was formed on the top surface of the glass plate by employing the same solution and baking conditions as in Example 1. The obtained glass board was comparable in transparency to the glass board of Example 1. This glass board was subjected to the tests described in Example 1. The results are shown in the following Table together with results of testing on the glasss boards of other examples and comparative examples. Every data in the Table is an average of measurements on five samples.

EXAMPLES 3–10

In these examples glass boards according to the invention were produced by using the same materials and liquid coating and baking operations as in Examples 1 and 2 except that the location and thickness of the antistatic coating film and the thickness of the lubricative coating film were selectively varied as shown in the Table.

The glass boards of Examples 2 to 10 were all good in transparency and practically equivalent to the glass board of Example 1. In every glass board the lubricative coating film was neither soiled nor scratched by the practical testing on the copying machine.

COMPARATIVE EXAMPLE 1

The chemically strengthened glass plate described in Example 1 was tested without any coating thereon.

COMPARATIVE EXAMPLES 2–4

Using the same materials and the same method, an antistatic coating film of tin oxide was formed on the top surface of the glass plate. The film thickness was variable as shown in the Table. No lubricative coating was made, so that in the operational test paper sheets slid directly on the antistatic coating film.

As to transparency, the glass boards of Comparative Examples 2 and 3 were good but the glass board of Comparative Example 4 was unsatisfactory. The practical testing on the copying machine resulted in considerable soiling and/or scratching of the antistatic coating film of every glass board.

COMPARATIVE EXAMPLES 5 AND 6

Using the same materials and the same methods as in Example 1, an antistatic coating film and a lubricative coating film were successively formed on the top side of the glass plate. As shown in the Table the thicknesses of the coating films were not in accordance with the present invention.

These glass boards were unsatisfactory in transparency. The practical testing on the copying machine resulted in considerable soiling and scratching of the lubricative coating film of the glass board of Comparative Example 5, though such phenomena did not occur on the glass board of Comparative Example 6.

| | Antistatic Coating Film (Å) | | Lubricative Coating Film (Å) | Angle of Slide (degree) | Surface Potential after feed of 10000 sheets of paper (kV) |
|---|---|---|---|---|---|
| | on top side | on back side | | | |
| Ex. 1 | 700 | — | 700 | 13.9 | −0.8 |
| Ex. 2 | — | 700 | 700 | 7.6 | −0.5 |
| Ex. 3 | 300 | — | 300 | 17.2 | −2.7 |
| Ex. 4 | 500 | — | 500 | 13.7 | −0.5 |
| Ex. 5 | 1000 | — | 1500 | 15.4 | −0.5 |
| Ex. 6 | 1500 | — | 2000 | 15.0 | −1.3 |
| Ex. 7 | — | 300 | 300 | 8.2 | +2.1 |
| Ex. 8 | — | 500 | 500 | 7.1 | −0.8 |
| Ex. 9 | — | 1000 | 1500 | 7.5 | −0.8 |
| Ex. 10 | — | 1500 | 2000 | 8.0 | −1.4 |
| Comp. Ex. 1 | — | — | — | 18.4 | +37.0 |
| Comp. Ex. 2 | 250 | — | — | 22.7 | +5.2 |
| Comp. Ex. 3 | 700 | — | — | 22.8 | 0.0 |
| Comp. Ex. 4 | 1700 | — | — | 23.5 | 0.0 |
| Comp. Ex. 5 | 1700 | — | 250 | 22.2 | 0.0 |
| Comp. Ex. 6 | 1700 | — | 2200 | 15.7 | −0.8 |

What is claimed is:

1. A glass board for use in a document copying machine, the board comprising:
   a transparent glass plate;
   a transparent and electroconductive antistatic coating layer which is formed on a top side of said glass plate and has a thickness in the range of from 300 to 1500 Å, said antistatic coating layer having the effect of reducing surface resistivity of the glass board to the level of $10^9$ ohms or less; and
   a transparent lubricative coating layer which is formed on the antistatic coating layer so as to provide a top surface of the glass board over at least a selected area where each sheet of original documents to be copied makes contact with the glass board and has a thickness in the range of from 300 to 2000 Å, said lubricative coating layer being high in durability and resistant to soiling and scratching and the material of said lubricative coating layer comprising an organic silicon compound having at least one Si atom to which at least one isocyanate group, —NCO, is attached.

2. A glass board according to claim 1, wherein the material of said antistatic coating layer comprises at least one metal oxide selected from the group consisting of tin oxide and indium oxide.

3. A glass board according to claim 1, wherein said organic silicon compound is selected from the group consisting of $Si(NCO)_4$, $CH_3Si(NCO)_3$, $CH_3OSi(NCO)_3$, $[(CH_3)_2Si(NCO)_2]O$,

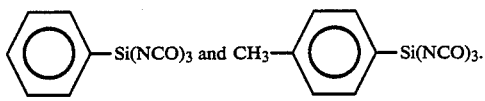

4. A glass board according to claim 1, wherein the thickness of said antistatic coating layer is in the range of from 500 to 1000 Å.

5. A glass board according to claim 1, wherein the thickness of said lubricative coating layer is in the range of from 500 to 1500 Å.

6. A glass board according to claim 1, wherein said glass plate is a strengthened glass plate.

7. A glass board for use in a document copying machine, the board comprising:
  a transparent glass plate;
  a transparent and electroconductive antistatic coating layer which is formed on a back side of said glass plate and has a thickness in the range of from 300 to 1500 Å, said antistatic coating layer having the effect of reducing surface resistivity of the glass board to the level of $10^9$ ohms or less; and
  a transparent lubricative coating layer which is formed on a top side of said glass plate directly on the glass surface so as to provide a top surface of the glass board over at least a selected area where each sheet of original documents to be copied makes contact with the glass board and has a thickness in the range of from 300 to 2000 Å, said lubricative coating layer being high in durability and resistant to soiling and scratching and the material of said lubricative coating layer comprising an organic silicon compound having at least one Si atom to which at least one isocyanate group, —NCO, is attached.

8. A glass board according to claim 7, wherein the material of said antistatic coating layer comprises at least one metal oxide selected from the group consisting of tin oxide and indium oxide.

9. A glass board according to claim 7, wherein said organic silicon compound is selected from the group consisting of $Si(NCO)_4$, $CH_3Si(NCO)_3$, $CH_3OSi(NCO)_3$, $[(CH_3)_2Si(NCO)_2]O$,

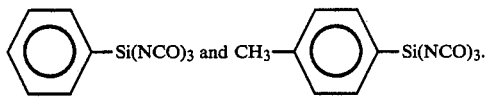

10. A glass board according to claim 7, wherein the thickness of said antistatic coating layer is in the range of from 500 to 1000 Å.

11. A glass board according to claim 7, wherein the thickness of said lubricative coating layer is in the range of from •to 1500 Å.

12. A glass board according to claim 7, wherein said glass plate is a strengthened glass plate.

* * * * *